May 13, 1924.
J. C. MILLER
AUTOMATIC TRAILER BRAKE
Filed Jan. 18, 1923
1,493,558
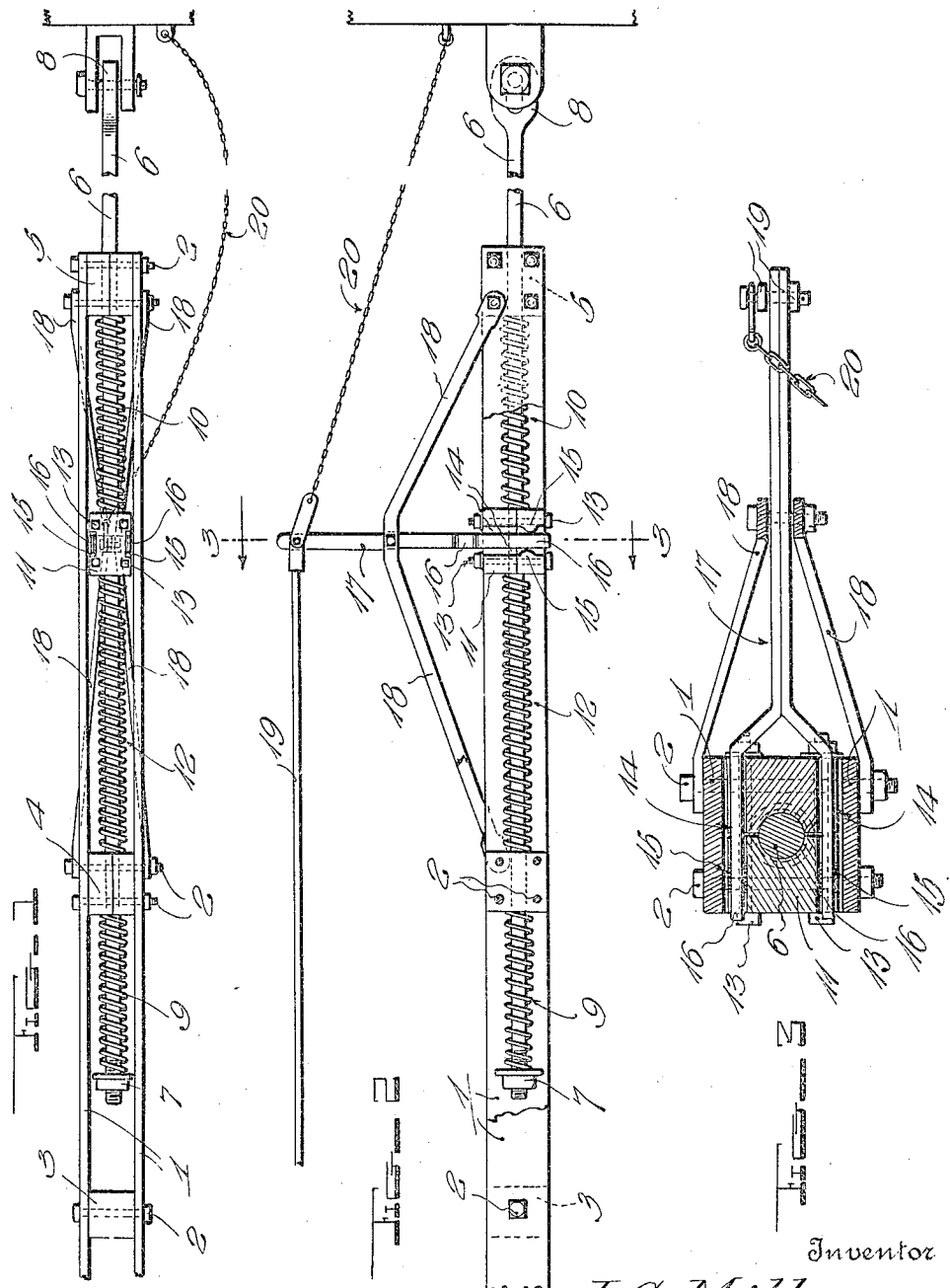
Inventor
J. C. Miller Patented May 13, 1924.

1,493,558

UNITED STATES PATENT OFFICE.

JOE C. MILLER, OF SAWTELLE, CALIFORNIA.

AUTOMATIC TRAILER BRAKE.

Application filed January 18, 1923. Serial No. 613,459.

*To all whom it may concern:*

Be it known that I, JOE C. MILLER, a citizen of the United States, residing at Sawtelle, in the county of Los Angeles and State of California, have invented certain new and useful Improvements in Automatic Trailer Brakes; and I do declare the following to be a full, clear, and exact description of the invention, such as will enable others skilled in the art to which it appertains to make and use the same.

My invention relates to improvements in trailer brakes of the type which are automatically applied when the pull upon the trailer tongue ceases, the principal object of the invention being to provide an extremely simple and inexpensive, yet a highly efficient and reliable brake of this character.

A further aim is to provide for automatically applying the brakes to the trailer in case the latter should become disconnected from the leading vehicle while being towed by the latter.

With the foregoing in view, the invention resides in the novel subject matter hereinafter described and claimed, the description being supplemented by the accompanying drawing.

Figure 1 is a side elevation of a trailer brake operator constructed in accordance with my invention.

Figure 2 is a top plan view.

Figure 3 is a vertical transverse sectional view as indicated by line 3—3 of Fig. 2.

In the drawing above briefly described, the numerals 1 designate a pair of spaced parallel side bars adapted to be suitably secured to the tongue of a trailer. These bars are secured by bolts or the like 2 to opposite sides of a suitable number of spacing blocks, three blocks being shown, designated by the numerals 3, 4 and 5. The blocks 4 and 5 are formed with openings through which a pull-rod 6 passes slidably and in order to facilitate assembly of the device, said blocks 4 and 5 are preferably formed of two sections held together by the bolts 2. The bars 1 and their spacing blocks constitute an outer pull member which co-operates with the rod 6 and certain springs described below, for the purpose of pulling the trailer and during this operation, relative movement of the two pull members serves to release the trailer brakes, whereas cessation of the pulling power will automatically produce application of said brakes.

In the construction shown, the rod 6 extends rearwardly beyond the block 4 and is provided with a nut or other suitable abutment 7, while the front end 8 of said rod is suitably adapted for connection with a leading vehicle. A coil spring 9 surrounds the rod 6 between the abutment 7 and the block 4 to carry part of the strain of towing the load, the remainder of this strain being carried by an additional spring 10 which abuts the front block 5 and an additional block 11 which is secured upon the rod. A cushioning spring 12 is preferably interposed between the blocks 4 and 11.

The block 11 is preferably formed of two sections clamped together around the rod 6 by bolts 13 and opposite sides of this block are formed with grooves 14 which extend transversely of the rod 6, the opposed side walls of said grooves being formed with suitably shaped lugs 15. The furcations 16 at the inner end of a bifurcated lever 17 are loosely received in the grooves 14 and are engaged with the lugs 15 to establish a pivotal connection between the block 11 and the lever. This lever is fulcrumed on an appropriate bracket or brackets 18 carried by the bars 1, and the outer end of said lever is connected with a brake applying rod or the like 19.

By the construction employed, when a pull is exerted upon the rod 6 by the motor or other leading vehicle, the rod 6 slides through the blocks 4 and 5 against the compression of the springs 9 and 10, and as the block 11 moves bodily with said rod, the lever 17 is moved around its fulcrum in such a manner that the brake rod 19 moves rearwardly and releases the brakes of the trailer. When the pulling power of the leading vehicle ceases however, the rod 6 moves rearwardly with respect to the bars 1 and thus the block 11 which is cushioned in its rearward movement by the spring 12, actuates the lever 17 and the brake rod 19 to apply the trailer brakes.

In connection with the features above described, I prefer to employ a safety chain 20 leading forwardly from the outer end of the lever 17 and adapted for connection with the leading vehicle. This chain is normally slack but if the coupler formed by the bars 1, the rod 6 and associated parts, should break loose from the leading machine, the chain will assist in applying the trailer brakes. To make this more clear, I would point out that in case of such breakage, the springs 9 and 10 will of course move the rod 6 rearwardly and through the medium of the part 17, the brake of the trailer will be applied. However, as the lead vehicle moves away from the trailer, the slack in the chain 20 will be taken up and when the latter is taut, a direct pull will be exerted on the rod 19 to practically lock the brake of the trailer. Hence, the chain assists in applying the brake of the trailer and holds it applied. Furthermore, since the chain constitutes a connection between the two vehicles, they will still be connected together even after the breakage of the part 6. Hence, it will be readily evident that breakage in the mechanism has occurred due to the fact that an excessive pull will be placed upon the lead vehicle. In connection with the foregoing, it is to be understood that the details specified are, of course, sufficiently strong to withstand the strain to which they are subjected and it is also to be understood that the proportions appearing in the drawings do not accurately show the relative sizes of parts.

As excellent results may be obtained from the details disclosed, these details may well be followed. It is to be understood however that within the scope of the invention as claimed, numerous minor changes may be made.

I claim:

1. A trailer brake operator comprising a pair of parallel bars and spacers to which they are secured, said spacers having alined openings, a pull rod between said bars received slidably in said openings, a bracket extending from said bars, a lever fulcrumed on said bracket and connected at one end to said rod, the outer end of said lever being adapted for connection to the trailer brakes, and a spring between said bars acting on said rod to shift the latter and apply the brakes when the pull on said rod ceases.

2. A trailer brake operator comprising a pair of parallel bars and a pair of longitudinally spaced spacing blocks to which they are secured, said blocks having alined openings, a pull rod passing slidably through said openings, a third block secured on said rod between said spacing blocks, coiled springs surrounding said rod and contacting at their ends with said blocks, a lever connected with said third block and adapted for connection with the trailer brakes, and a bracket extending from said bars and carrying the fulcrum of said lever.

3. A trailer brake operator comprising an outer pull member having a guide and a laterally extending bracket, a pull rod passing through said guide, a block secured upon said rod and having grooves in its opposite sides extending transversely of said rod, the opposed side walls of said grooves having inwardly extending lugs, a lever fulcrumed on said bracket and having a bifurcated end whose furcations are received in said grooves in engagement with said lugs, the outer end of said lever being adapted for connection with the brakes of a trailer, and spring means for operating said rod and lever to apply the trailer brakes when the pull on said pull member and pull rod ceases.

4. A trailer brake operator comprising a coupler for connecting the trailer to a leading vehicle, said coupler having a forwardly movable brake applying member for applying the trailer brakes when the pull on the coupling member ceases, and a connection leading forwardly from said member for attachment to the leading vehicle to assist in operating said member in case the coupler should become detached from the leading vehicle.

In testimony whereof I have hereunto affixed my signature.

JOE C. MILLER.